US008266415B2

(12) United States Patent
Hu et al.

(10) Patent No.: US 8,266,415 B2
(45) Date of Patent: Sep. 11, 2012

(54) ELECTRONIC DEVICE BOARD LEVEL SECURITY

(75) Inventors: Nanfang Hu, Palo Alto, CA (US); Xuezhang Dong, San Jose, CA (US); Yan Wang, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 1180 days.

(21) Appl. No.: 12/037,141

(22) Filed: Feb. 26, 2008

(65) Prior Publication Data

US 2009/0212813 A1 Aug. 27, 2009

(51) Int. Cl.
*G06F 9/00* (2006.01)
*G06F 15/177* (2006.01)

(52) U.S. Cl. .......................................................... 713/1
(58) Field of Classification Search ................. 713/1, 2
See application file for complete search history.

(56) References Cited

U.S. PATENT DOCUMENTS

| | | | |
|---|---|---|---|
| 5,734,819 A * | 3/1998 | Lewis ............................... | 726/29 |
| 5,892,906 A * | 4/1999 | Chou et al. ...................... | 726/19 |
| 6,594,255 B1 * | 7/2003 | Neuman ......................... | 370/352 |
| 6,725,385 B1 * | 4/2004 | Chu et al. ....................... | 713/320 |
| 2002/0166072 A1 * | 11/2002 | Cromer et al. ................. | 713/202 |
| 2003/0045249 A1 * | 3/2003 | Nielsen .......................... | 455/118 |
| 2004/0199766 A1 * | 10/2004 | Chew et al. ..................... | 713/168 |
| 2005/0198541 A1 * | 9/2005 | Kutz et al. ...................... | 713/300 |
| 2007/0113109 A1 * | 5/2007 | Kim ............................... | 713/300 |

* cited by examiner

*Primary Examiner* — Mohammed Rehman
(74) *Attorney, Agent, or Firm* — Brake Hughes Bellermann LLP

(57) ABSTRACT

A system may include a printed circuit board, a first component located on the printed circuit board, the first component having a first unique identifier and a processor located on the printed circuit board, the processor including a one time programming section. The processor may acquire the first unique identifier from the first component and store the first unique identifier in the one time programming section during the first time initialization. Upon subsequent initializations, the processor may acquire the first unique identifier from the first component and compare the first unique identifier to the stored first unique identifier. The processor may allow the subsequent initializations to proceed if the first unique identifier matches the stored first unique. The processor may disallow the subsequent initializations from proceeding if the first unique identifier does not match the stored first unique identifier.

21 Claims, 4 Drawing Sheets

ELECTRONIC DEVICE BOARD LEVEL SECURITY

TECHNICAL FIELD

This description relates to electronic device board level security.

BACKGROUND

Printed circuit boards typically include one or more electronic components and are used in many different electronic devices such as, for example, personal computers, laptop computers, MP3 players, cellular phones and personal digital assistants (PDAs). Hackers may attempt to reverse engineer a board and its electronic components to gain information about the functioning and operation of the board and the electronic components. In some cases, the hacked information may be used to produce unauthorized copies of the boards and the electronic components for use in unauthorized and/or black market electronic devices. For example, the information may be used to create boards and devices where one or more electronic components on the boards have been illegally changed out with other components.

SUMMARY

The details of one or more implementations are set forth in the accompanying drawings and the description below. Other features will be apparent from the description and drawings, and from the claims.

DETAILED DESCRIPTION

Figure 1:
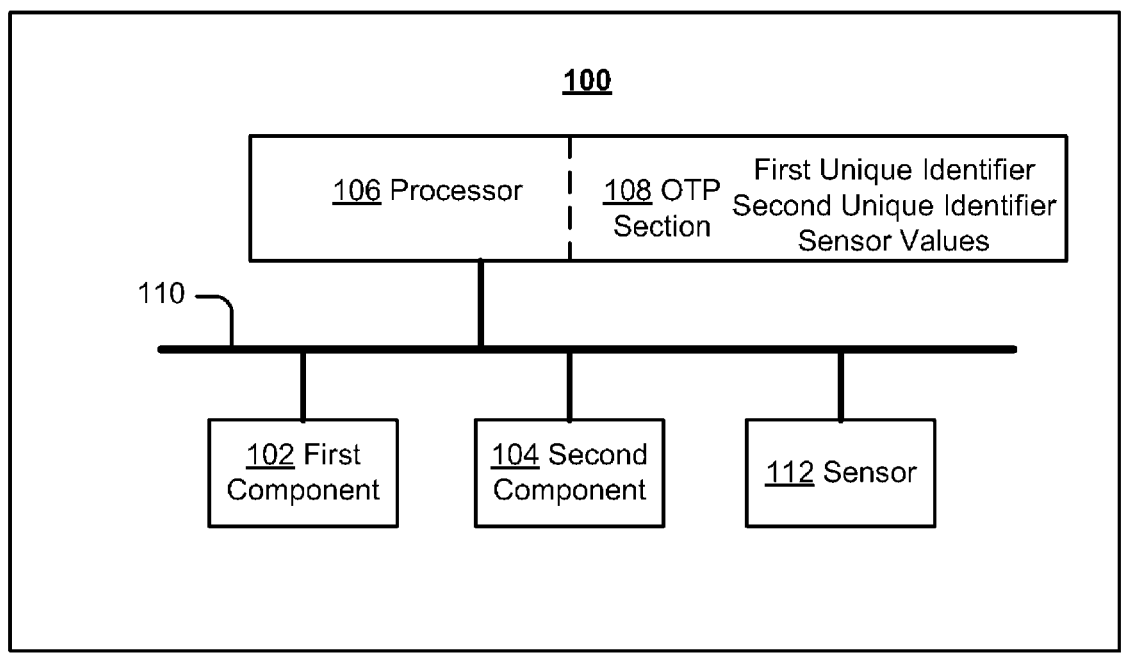
FIG. 1 is an exemplary block diagram of a printed circuit board.

Referring to FIG. 1, a printed circuit board (PCB) 100 may include a first component 102 located on the PCB 100, a second component 104 located on the PCB 100, and a processor 106 located on the PCB 100. The components may be configured to communicate with each other using bus 110.

The PCB 100 may be arranged and configured to operate and function in various type of devices. For example, the PCB 100 may be included in a personal computer (PC), a server, a cellular phone, an MP3 player, a personal digital assistant (PDA) and any other type of electronic device that may include a PCB.

The first component 102 may have at least one unique identifier that specifically identifies the first component. For example, the unique identifier may be a manufacturer's identification code, where the code may be in alphanumeric, binary, and/or hexadecimal form. In another exemplary implementation, the unique identifier may include a unique signature that is particular to that component on the PCB 100. The first component 102 may have more than one unique identifier that specifically identifies the first component. For example, the first component 102 may have a unique manufacturer's identification code and a unique signature. In another exemplary implementation, the first component 102 may have multiple unique identification codes. The unique identifier for the first component 102 may be referred to below as the first unique identifier.

The second component 104 may have at least one unique identifier that specifically identifies the second component. For example, the unique identifier may be a manufacturer's identification code, where the code may be in alphanumeric, binary, and/or hexadecimal form. In another exemplary implementation, the unique identifier may include a unique signature that is particular to that component on the PCB 100. The second component 104 may have more than one unique identifier that specifically identifies the second component. For example, the second component 104 may have a unique manufacturer's identification code and a unique signature. In another exemplary implementation, the second component 104 may have multiple unique identification codes. The unique identifier for the second component 104 may be referred to below as the second unique identifier.

The processor 106 may be arranged and configured to perform one or more processing functions. The processor 106 may include a section referred to as a one time programming (OTP) section 108. The OTP section 108 may be programmed one time with information and then that information is bound to the processor 106 within the OTP section 108. The OTP section 108 may be programmed with information that is to be kept permanently and not deleted or erased. Prior to being programmed, the OTP section 108 may be blank and may not include any information. During the manufacturing and assembly of the PCB 100, the OTP section 108 of the processor 106 may be programmed as part of the manufacturing process.

In one exemplary implementation, the OTP section 108 may be programmed with the first unique identifier from the first component 102. For example, upon a first time initialization (e.g., during a manufacturing process for the PCB 100), the processor 106 may acquire the first unique identifier from the first component 102 and store the first unique identifier in the OTP section 108. Once the first unique identifier is stored in the OTP section 108 during this initial process, the OTP section 108 may not be programmed again. Thus, the storage of the first unique identifier is permanent in the OTP section 108.

Upon each subsequent initialization of the PCB 100, the processor 106 may acquire the first unique identifier from the first component 102 and compare the acquired identifier to the first unique identifier that was previously stored in the OTP section 108. If the acquired identifier from the first component 102 matches the first unique identifier previously stored in the OTP section 108, then the processor 106 may allow the initialization of the processor 106 and the PCB 100 to proceed. The initialization may be the boot up process for the processor 106 and the overall PCB 100, including all of the PCB components. However, if the acquired identifier from the first component 102 does not match the first unique identifier stored in the OTP section 108, then the processor 106 may disallow the initialization of the processor 106 and the PCB 100 from proceeding. When the identifiers do not match, the processor 106 may take action by shutting down itself so that the PCB 100 does not function and/or the processor 106 may cause one or more of the components on the PCB 100, including the entire PCB, to cease functioning and/or to shut down.

In this manner, the processor 106 is performing a check upon each initialization to make sure that the first component 102 is the exact same first component as when the PCB 100 was first assembled and first initialized. If the first component 102 has been removed, such that the processor 106 cannot acquire the first unique identifier during a subsequent initialization, then the processor 106 may disallow the initialization from proceeding. Similarly, if the first component 102 has been replaced, even with a same or similar component, then the identifier from the replaced component will not match the stored first unique identifier and the processor 106 may disallow the initialization from proceeding. In this manner, board level security is provided because a check is being performed each time the PCB 100 may be booted up. If the PCB 100 has been tampered with, for example, by removing the first component 102 or by replacing the first component 102, then the processor 106 may prevent the PCB 100 from functioning.

In one exemplary implementation, the OTP section 108 may be programmed with the second unique identifier from the second component 104. For example, upon a first time initialization (e.g., during a manufacturing process for the PCB 100), the processor 106 may acquire the second unique identifier from the second component 104 and store the second unique identifier in the OTP section 108. Once the second unique identifier is stored in the OTP section 108 during this initial process, the OTP section 108 may not be programmed again. Thus, the storage of the second unique identifier is permanent in the OTP section 108.

Upon each subsequent initialization of the PCB 100, the processor 106 may acquire the second unique identifier from the second component 104 and compare the acquired identifier to the second unique identifier that was previously stored in the OTP section 108. If the acquired identifier from the second component 104 matches the second unique identifier previously stored in the OTP section 108, then the processor 106 may allow the initialization of the processor 106 and the PCB 100 to proceed. The initialization may be the boot up process for the processor 106 and the overall PCB 100, including all of the PCB components. However, if the acquired identifier from the second component 104 does not match the second unique identifier stored in the OTP section 108, then the processor 106 may disallow the initialization of the processor 106 and the PCB 100 from proceeding. When the identifiers do not match, the processor 106 may take action by shutting down itself so that the PCB 100 does not function and/or the processor 106 may cause one or more of the components on the PCB 100, including the entire PCB, to cease functioning and/or to shut down.

In this manner, the processor 106 is performing a check upon each initialization to make sure that the second component 104 is the exact same second component as when the PCB 100 was first assembled and first initialized. If the second component 104 has been removed, such that the processor 106 cannot acquire the second unique identifier during a subsequent initialization, then the processor 106 may disallow the initialization from proceeding. Similarly, if the second component 104 has been replaced, even with a same or similar component, then the identifier from the replaced component will not match the stored second unique identifier and the processor 106 may disallow the initialization from proceeding. In this manner, board level security is provided because a check is being performed each time the PCB 100 may be booted up. If the PCB 100 has been tampered with, for example, by removing the second component 104 or by replacing the second component 104, then the processor 106 may prevent the PCB 100 from functioning.

In one exemplary implementation, the OTP section 108 may be programmed with more than one unique identifier from more than one component. For example, the OTP section 108 may be programmed with the first unique identifier from the first component 102 and the second unique identifier from the second component 104. For example, upon a first time initialization (e.g., during a manufacturing process for the PCB 100), the processor 106 may acquire the first unique identifier from the first component 102 and may acquire the second unique identifier from the second component 104. The first unique identifier and the second unique identifier may be stored in the OTP section 108. Once the first unique identifier and the second unique identifier are stored in the OTP section 108 during this initial process, the OTP section 108 may not be programmed again. Thus, the storage of the first unique identifier and the second unique identifier is permanent in the OTP section 108.

Upon each subsequent initialization of the PCB 100, the processor 106 may acquire the first unique identifier from the first component 102 and the second unique identifier from the second component 104 and compare the acquired first identifier to the first unique identifier and the acquired second identifier to the second unique identifier that were previously stored in the OTP section 108. If the acquired first identifier from the first component 102 matches the first unique identifier previously stored in the OTP section 108 and the acquired second identifier from the second component 104 matches the second unique identifier previously stored in the OTP section 108, then the processor 106 may allow the initialization of the processor 106 and the PCB 100 to proceed. The initialization may be the boot up process for the processor 106 and the overall PCB 100, including all of the PCB components. However, if the acquired identifier from the first component 102 does not match the first unique identifier stored in the OTP section 108 or the acquired identifier from the second component 104 does not match the second unique identifier stored in the OTP section 108, then the processor 106 may disallow the initialization of the processor 106 and the PCB 100 from proceeding. When either of the identifiers do not match, the processor 106 may take action by shutting down itself so that the PCB 100 does not function and/or the processor 106 may cause one or more of the components on the PCB 100, including the entire PCB, to cease functioning and/or to shut down.

In this manner, the processor 106 is performing a check upon each initialization to make sure that the first component 102 and the second component 104 are the exact same components as when the PCB 100 was first assembled and first initialized. If the first component 102 or the second component 104 has been removed, such that the processor 106 cannot acquire the first unique identifier or the second unique identifier during a subsequent initialization, then the processor 106 may disallow the initialization from proceeding. Similarly, if the first component 102 or the second component 104 has been replaced, even with a same or similar component, then the identifier from the replaced component will not match the stored first unique identifier or the stored second unique identifier and the processor 106 may disallow the initialization from proceeding. In this manner, board level security is provided because a check is being performed each time the PCB 100 may be booted up. If the PCB 100 has been tampered with, for example, by removing the first component 102 or the second component 104 or by replacing the first component 102 or the second component 104, then the processor 106 may prevent the PCB 100 from functioning.

Thus, the processor 106 and the OTP section 108 of the processor may be configured to store one or more unique identifiers and to perform a check of the one or more unique identifiers upon each initialization or boot up of the PCB 100. The PCB 100 may include other additional components (not shown). The processor 106 may be configured to store all or less than all of the unique identifiers for the components of the PCB 100 and to perform a check of all or less than all of the unique identifiers upon each initialization or boot up of the PCB 100.

The PCB 100 also may include a sensor 112 that is located on the PCB 100. The sensor 112 may be arranged and configured to sense at least one characteristic of the PCB 100. The characteristic that is being sensed by the sensor 112 may be a board level characteristic or a component level characteristic.

The sensor 112 may be configured to sense a single characteristic or multiple characteristics. In one exemplary implementation, the sensor 112 may include a voltage sensor, a current sensor, and/or a temperature sensor. The sensor 112 may be positioned on the PCB 100 such that the sensor 112 senses a characteristic related to the first component 102 and/or the second component 104. Thus, the sensor 112 may be configured to sense a characteristic that is related to one or more of the components located on the PCB 100.

Upon a first time initialization (e.g., during a manufacturing process for the PCB 100), the processor 106 may be arranged and configured to acquire a value of the characteristic of the PCB 100 from the sensor 112 and store the value of the characteristic as a range of values in the OTP section 108 of the processor 106. Once the range of values is stored in the OTP section 108 during this initial process, the OTP section 108 may not be programmed again. Thus, the storage of the range of values is permanent in the OTP section 108.

Upon each subsequent initialization of the PCB 100, the processor 106 may acquire the value of the characteristic from the sensor 112 and compare the acquired value to the range of values that are stored in the OTP section 108. If the acquired value from the sensor 112 is within the range of values stored in the OTP section 108, then the processor 106 may allow the initialization of the processor 106 and the PCB 100 to proceed. The initialization may be the boot up process for the processor 106 and the overall PCB 100, including all of the PCB components. However, if the acquired value does not fall within the ranges of values, then the processor 106 may disallow the initialization of the processor 106 and the PCB 100 from proceeding. When the acquired value does not fall within the range of stored values, the processor 106 may take action by shutting down itself so that the PCB 100 does not function and/or the processor 106 may cause one or more of the component on the PCB 100, including the entire PCB, to cease functioning and/or to shut down.

In this manner, the processor 106 is performing a check upon each initialization to make sure that the characteristics of the PCB 100 have not changed such as, for example, by removing or replacing one or more of the components of the PCB 100. If a component has been removed and/or replaced, then the value of the characteristic of the PCB 100 may no longer fall within the ranges of values stored in the OTP section 108 and the processor 106 may take action to shut down and/or prevent the PCB 100 from being used. In this manner, board level security is provided because a check is being performed each time the PCB 100 may be booted up. If the PCB 100 has been tampered with, for example, by removing one or more of the components (e.g., first component 102 and/or second component 104) or by replacing one or more of the components (e.g., first component 102 and/or second component 104), then the processor 106 may take action to prevent the PCB 100 from functioning.

Similarly, if an additional component or a probe or other node is introduced to the PCB 100, the value of the characteristic of the PCB 100 may change and fall outside of the range of values stored in the OTP section 108 of the processor 106. For example, a probe may be introduced to the PCB 100 in order to reverse engineer and decode the functioning and features of the components and processor on the PCB 100. By providing a check of the value of the characteristic of the PCB 100 upon each initialization, then the processor 106 may detect an attempt at an unauthorized access to the PCB 100 and take action to shut down the PCB 100. These actions by the processor 106 may prevent someone from hacking into the PCB 100 and its components.

In one exemplary implementation, the OTP section 108 may be programmed with one or more unique identifiers from one or more components, respectively, and a value or range of values for a characteristic of the PCB 100. For example, upon a first time initialization (e.g., during a manufacturing process for the PCB 100), the processor may acquire a first unique identifier from the first component 102, a second unique identifier from the second component 104, and a value of the characteristic of the PCB 100 from the sensor 112. The first unique identifier and the second unique identifier may be stored in the OTP section 108. The value of the characteristic may be stored in the OTP section 108 as a range of values. Once the first unique identifier, the second unique identifier and the range of values have been stored in the OTP section 108, they are permanently programmed in the OTP section 108.

Upon each subsequent initialization of the PCB 100, the processor 106 may acquire the first unique identifier from the first component 102, the second unique identifier from the second component 104, and the value of the characteristic from the sensor 112. The processor 106 may compare the acquired identifiers and value to the respective stored unique identifiers and the range of values stored in the OTP section 108. If the acquired identifiers match the respective stored unique identifiers and the acquired value falls within the stored range of values, then the processor 106 may allow the initialization of the processor 106 and the PCB 100 to proceed. However, if one of the acquired identifiers does not match its respective stored identifier or the acquired value does not fall within the range of the stored values, then the processor 106 may disallow the initialization of the processor 106 and the PCB 100 from proceeding. The processor 106 may take action by shutting itself so that the PCB 100 does not function and/or the processor 106 may cause one or more of the components on the PCB 100, including the entire PCB 100, to cease functioning and/or to shut down.

In this manner, board level security is provided because a check is being performed each time the PCB 100 may be booted up. If the PCB 100 has been tampered with, then the processor 106 may prevent the PCB 100 from functioning.

In one exemplary implementation, the sensor 112 may include a voltage sensor. The characteristic of the PCB 100 that may be sensed may be a voltage on the PCB 100. The voltage may be related to one or more of the components. For instance, the voltage sensed may be a voltage between the first component 102 and the second component 104 on the PCB 100. Upon a first time initialization, the processor 106 may acquire the voltage from the sensor 112 and store the voltage as a range of voltages in the OTP section 108, such that the range of voltages becomes permanently programmed in the OTP section 108. Upon subsequent initialization, the processor 106 may acquire the voltage from the sensor 112 and compare the acquired voltage to the stored range of voltages. If the acquired voltage falls within the stored range of voltages, then the processor 106 may allow the initialization of the processor 106 and the PCB 100 to proceed. If the acquired voltage does not fall within the stored range of voltages, then the processor 106 may disallow the initialization of the processor 106 and the PCB 100 from proceeding.

In one exemplary implementation, the sensor 112 may include a current sensor. The characteristic of the PCB 100 that may be sensed may be a current on the PCB 100. The current may be related to one or more of the components. For instance, the current sensed may be a current between the first component 102 and the second component 104 on the PCB 100. Upon a first time initialization, the processor 106 may acquire the current from the sensor 112 and store the current as a range of currents in the OTP section 108, such that the range of currents becomes permanently programmed in the OTP section 108. Upon subsequent initialization, the processor 106 may acquire the current from the sensor 112 and compare the acquired current to the stored range of currents. If the acquired current falls within the stored range of currents, then the processor 106 may allow the initialization of the processor 106 and the PCB 100 to proceed. If the acquired current does not fall within the stored range of currents, then the processor 106 may disallow the initialization of the processor 106 and the PCB 100 from proceeding.

In one exemplary implementation, the sensor 112 may include a temperature sensor. The characteristic of the PCB 100 that may be sensed may be a temperature on the PCB 100. The temperature may be related to one or more of the components. For instance, the temperature sensed may be a temperature between the first component 102 and the second component 104 on the PCB 100. Upon a first time initialization, the processor 106 may acquire the temperature from the sensor 112 and store the temperature as a range of temperatures in the OTP section 108, such that the range of temperatures becomes permanently programmed in the OTP section 108. Upon subsequent initialization, the processor 106 may acquire the temperature from the sensor 112 and compare the acquired temperature to the stored range of temperatures. If the acquired temperature falls within the stored range of temperatures, then the processor 106 may allow the initialization of the processor 106 and the PCB 100 to proceed. If the acquired temperature does not fall within the stored range of temperatures, then the processor 106 may disallow the initialization of the processor 106 and the PCB 100 from proceeding.

Figure 2:
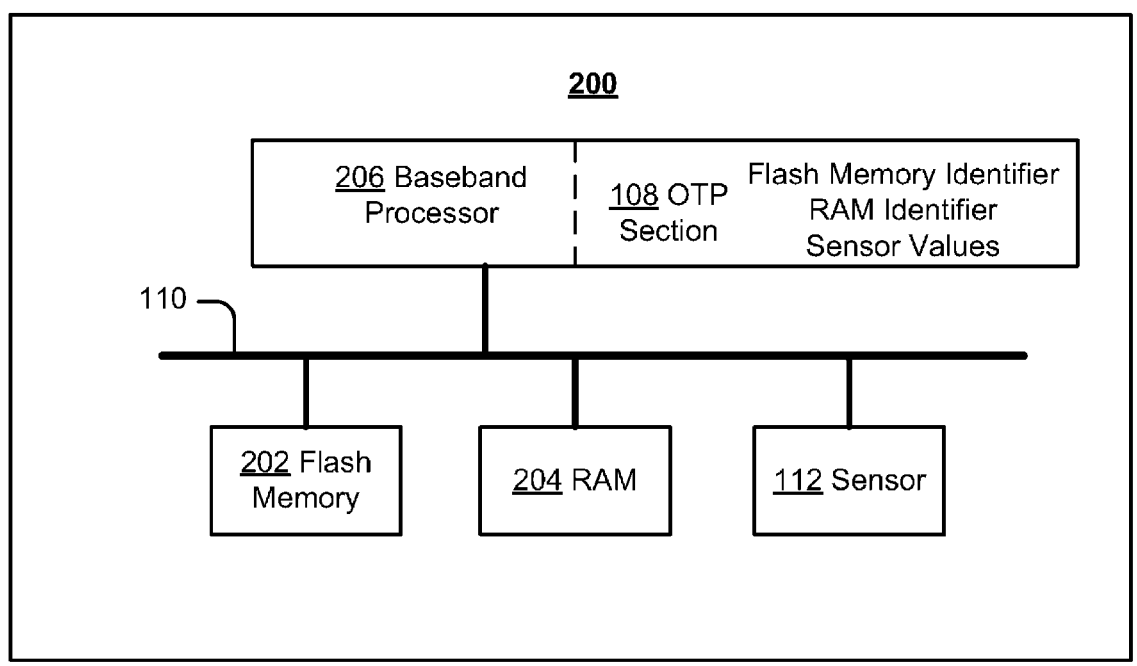
FIG. 2 is an exemplary block diagram of a printed circuit board.

Referring to FIG. 2, a PCB 200 is illustrated. In this exemplary implementation, the PCB 200 may be used in a cellular phone or in any device that may include cellular phone features and functionality. The PCB 200 may include a flash memory 202, a random access memory (RAM) 204, a baseband processor 206 having an OTP section 108, and a sensor 112. The PCB 200 also may include a bus 110 to enable the components to communicate with one another and to function together as a unit. It is understood that the PCB 200 may include other components (not shown) for the functioning of the board in a cellular phone-type device.

In this exemplary implementation, the flash memory 202 may include a unique identifier that uniquely identifies the flash memory 202 and may be referred to as the flash memory identifier below. The flash memory 202 may be configured to store one or more application programs, which may be accessed by one or more components of the PCB 200, including the baseband processor 206, to cause the PCB 200 to perform properly. The application programs may control the features and functionality of the PCB 200 and may be run by the baseband processor 206.

The RAM 204 may include a unique identifier that uniquely identifies the RAM 204 and may be referred to as the RAM identifier below. The sensor 112 may include the features and functionality of the sensor 112 of FIG. 1, as described above.

The OTP section 108 of the baseband processor 206 may function as described above with respect to the OTP section 108 of FIG. 1, as described above.

In one exemplary implementation, the OTP section 108 may be programmed with the flash memory identifier, the RAM identifier, and/or a range of values for a characteristic of the PCB 200. For example, during a first time initialization (e.g., during a manufacturing process for the PCB 200), the baseband processor 206 may acquire the flash identifier from the flash memory 202, the RAM identifier from the RAM 204 and/or a value for a characteristic for the PCB 200 from the sensor 112. The baseband processor 206 may store the flash identifier and the RAM identifier in the OTP section 108. The baseband processor 206 may store the value for the characteristic for the PCB 200 as a range of values in the OTP section 108. The flash identifier, the RAM identifier and the range of values may be permanently programmed in the OTP section 108 during the first time initialization of the PCB 200.

Upon each subsequent initialization, the baseband processor 206 may acquire the flash memory identifier from the flash memory 202, the RAM identifier from the RAM 204 and/or the value of the characteristic from the sensor 112. The baseband processor 206 may compare the acquired identifiers to the respective stored identifiers and the value to the stored range of values. If the acquired identifiers match the stored identifiers and the acquired value is within the stored range of values, then the baseband processor 206 may allow the initialization of the baseband processor 206 and the PCB 200 to proceed. If either of the acquired identifiers does not match their respective stored identifiers or the acquired value is not within the stored range of values, then the baseband processor 206 may disallow the itself and the PCB 200 from proceeding with the initialization. When one of the identifiers do not match or the value is not within the range of values, the baseband processor 206 may take action by shutting down itself so that the PCB 200 does not function and/or the baseband processor 206 may cause one or more of the components on the PCB 200, including the entire PCB, to cease functioning and/or to shut down.

In this manner, the baseband processor 206 is performing a check upon each initialization to make sure that the flash memory 202 and the RAM 204 have not been removed, replaced and/or tampered with in some way. Thus, board level security is being provided.

Figure 3A:
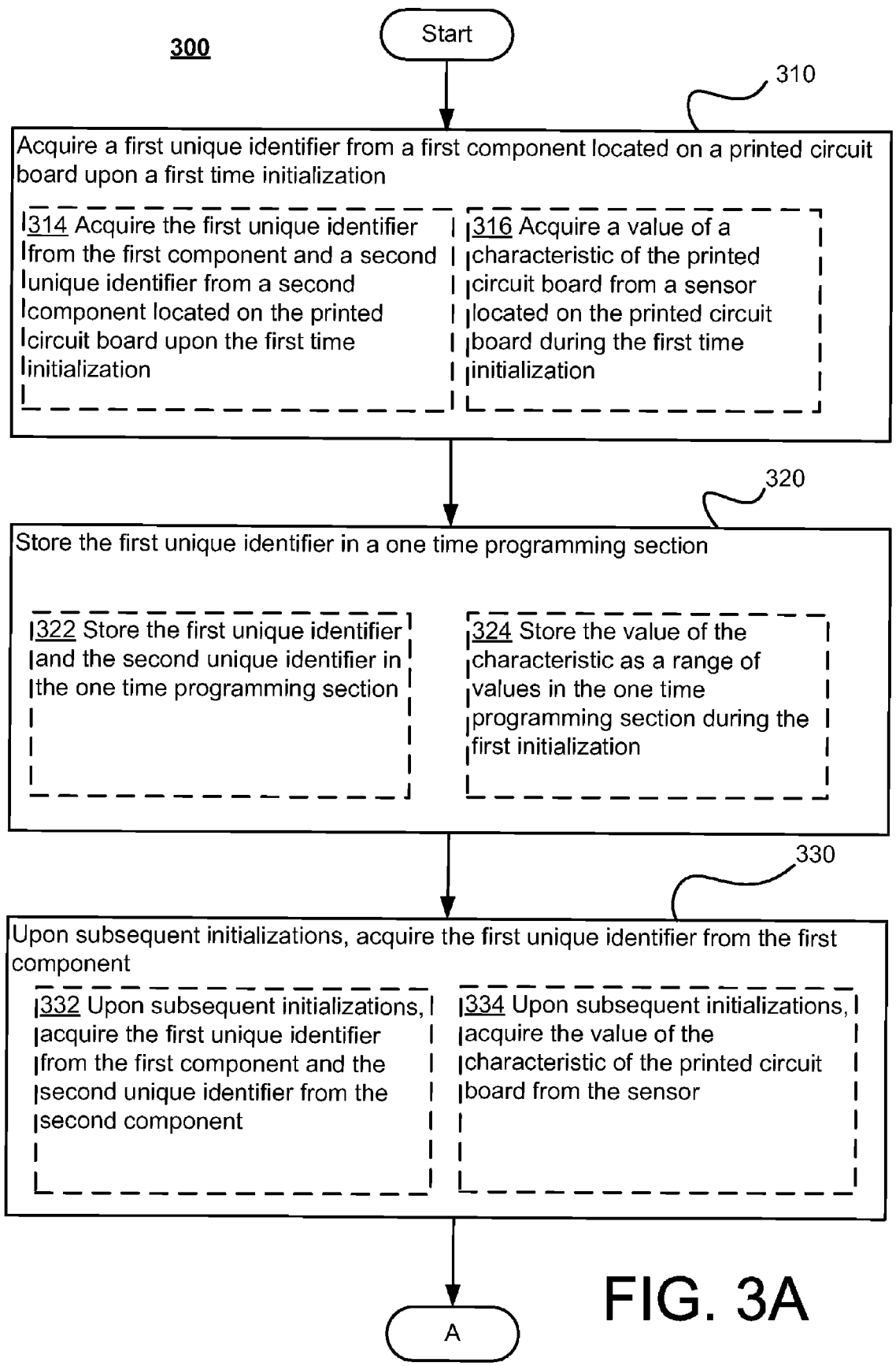
FIGS. 3A and 3B illustrate an exemplary flowchart of example operations of the system of FIG. 1.
Figure 3B:
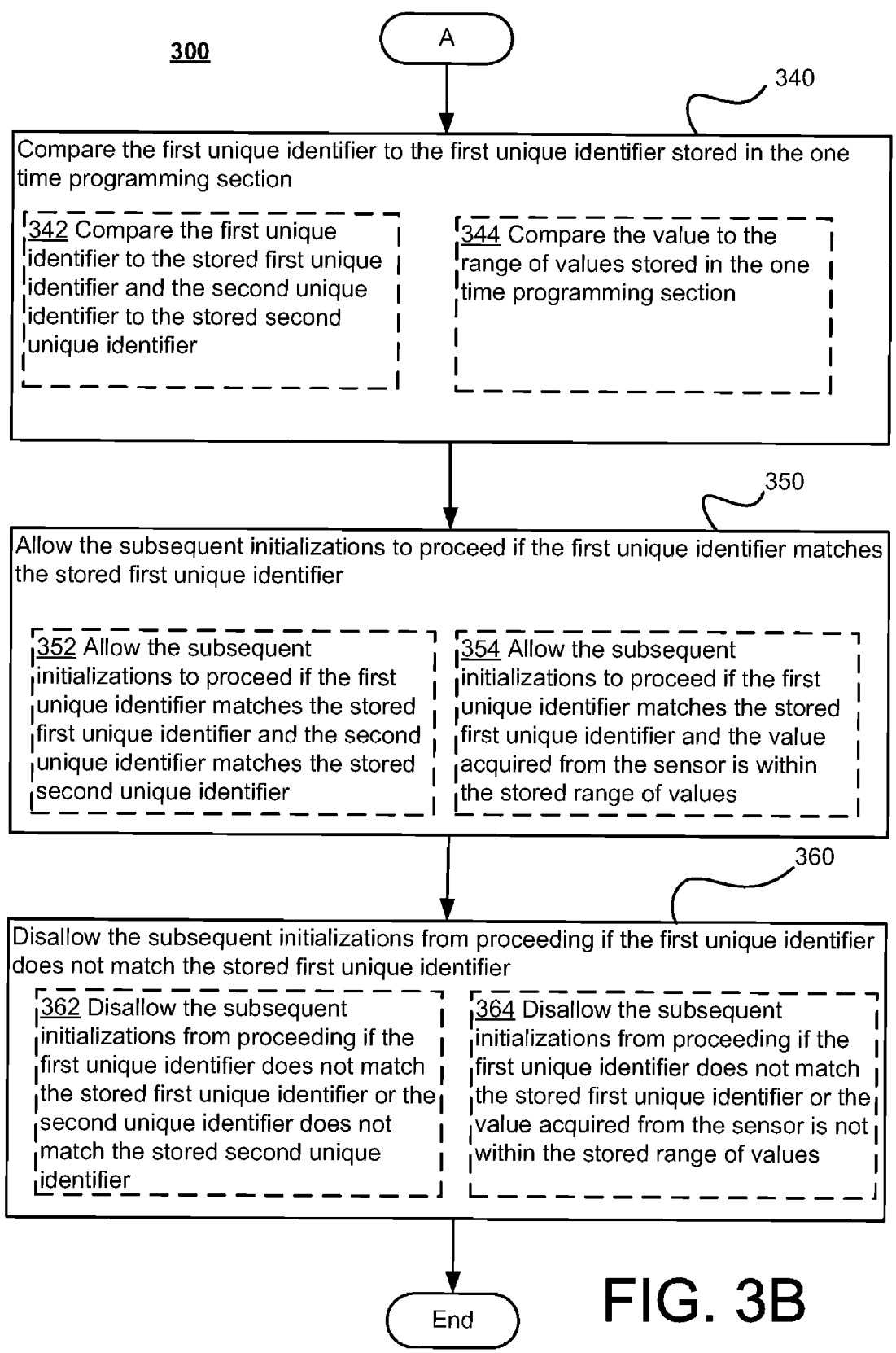

Referring to FIGS. 3A and 3B, an exemplary process 300 illustrates an example process of the functioning of the processor 106 of FIG. 1. Process 300 may include acquiring a first unique identifier from a first component located on a PCB upon a first time initialization (310) and storing the first unique identifier in an OTP section (320). Upon subsequent initializations, the process 300 may include acquiring the first unique identifier from the first component (330) and comparing the first unique identifier to the first unique identifier stored in the OTP section (340). If the first unique identifier matches the stored first unique identifier, then the subsequent initializations may be allowed to proceed (350). If the first unique identifier does not match the stored first unique identifier, then the subsequent initializations may be disallowed from proceeding (360).

In one exemplary implementation, the processor 106 may acquire the first unique identifier from the first component 102 located on a PCB 100 upon a first time initialization (310). Acquiring the first unique identifier (310) may further include acquiring the first unique identifier from the first component and a second unique identifier from a second component located on the PCB upon the first time initialization (314). For example, the processor 106 may acquire the first unique identifier from the first component 102 located on a PCB 100 and the second identifier from the second component 104 located on the PCB 100 upon the first time initialization (314).

Process 300 may further include acquiring a value of a characteristic of the PCB from a sensor located on the PCB during the first time initialization (316). For example, the processor 106 may acquire the value of a characteristic of the PCB 100 from the sensor 112 during the first time initialization (316).

In one exemplary implementation, the processor 106 may store the first unique identifier in an OTP section 108 (320). Storing the first unique identifier (320) may further include storing the first unique identifier and the second unique identifier in the OTP section (322). For example, the processor 106 may store the first unique identifier and the second unique identifier in the OTP section 108 (322).

Process 300 may further include storing the value of the characteristic of the PCB as a range of values in the OTP section during the first initialization (324). For example, the processor 106 may store the value of the characteristic of the PCB 100 as a range of values in the OTP section 108 (324).

In one exemplary implementation, upon subsequent initializations, the processor 106 may acquire the first unique identifier from the first component 102 (330). Acquiring the first unique identifier from the first component (330) may further include, upon subsequent initializations, acquiring the first unique identifier from the first component and the second unique identifier from the second component (332). For example, upon subsequent initializations, the processor 106 may acquire the first unique identifier from the first component 102 and the second unique identifier from the second component 104 (332).

Process 300 may further include, upon subsequent initializations, acquiring the value of the characteristic of the PCB from the sensor (334). For example, the processor 106, upon subsequent initializations, may acquire the value of the characteristic of the PCB 100 from the sensor 112 (334).

In one exemplary implementation, the processor 106 may compare the first unique identifier to the first unique identifier stored in the OTP section 108 (340). Comparing the first unique identifier (340) may further include comparing the first unique identifier to the stored first unique identifier and the second unique identifier to the stored second unique identifier (342). For example, the processor 106 may compare the first unique identifier to the stored first unique identifier and the second unique identifier to the stored second unique identifier.

Process 300 may further include comparing the value to the range of values stored in the OTP section (344). For example, the processor 106 may compare the value to the range of values stored in the OTP section 108 (344).

In one exemplary implementation, the processor 106 may allow the subsequent initializations to proceed if the first unique identifier matches the stored unique identifier (350). Allowing the subsequent initializations to proceed (350) may further include allowing the subsequent initializations to proceed if the first unique identifier matches the stored first unique identifier and the second unique identifier matches the stored second unique identifier (352). For example, the processor 106 may allow the subsequent initializations to proceed if the first unique identifier matches the stored first unique identifier and the second unique identifier matches the stored second unique identifier (352).

Allowing the subsequent initializations to proceed (350) may further include allowing the subsequent initializations to proceed if the first unique identifier matches the stored first unique identifier and the value acquired from the sensor is within the stored range of values (354). For example, the processor 106 may allow the subsequent initializations to proceed if the first unique identifier matches the stored first unique identifier and the value acquired from the sensor 112 is within the stored range of values (354).

In one exemplary implementation, the processor 106 may disallow the subsequent initializations from proceeding if the first unique identifier does not match the stored first unique identifier (360). Disallowing the subsequent initializations from proceeding (360) may further include disallowing the subsequent initializations from proceeding if the first unique identifier does not match the stored first unique identifier or the second unique identifier does not match the stored second unique identifier (362). For example, the processor 106 may disallow the subsequent initializations from proceeding if the first unique identifier does not match the stored first unique identifier or the second unique identifier does not match the stored second unique identifier (362).

Disallowing the subsequent initializations from proceeding (360) may further include disallowing the subsequent initializations from proceeding if the first unique identifier does not match the stored first unique identifier or value acquired from the sensor is not within the stored range of values (364). For example, the processor 106 may disallow the subsequent initializations from proceeding if the first unique identifier does not match the stored first unique identifier or value acquired from the sensor 112 is not within the stored range of values (364).

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations.

What is claimed is:

1. A system, comprising:
  a printed circuit board;
  a first component located on the printed circuit board, the first component having a first unique identifier;
  a second component located on the printed circuit board, the second component having a second unique identifier; and
  a processor located on the printed circuit board that includes a one time programming section and that is arranged and configured to:
    acquire the first unique identifier from the first component and the second unique identifier from the second component upon a first time initialization;
    store the first unique identifier and the second unique identifier in the one time programming section during the first time initialization;
    upon subsequent initializations, acquire the first unique identifier from the first component and the second unique identifier from the second component;
    compare the first unique identifier to the stored first unique identifier and the second unique identifier to the stored second unique identifier;
    allow the subsequent initializations to proceed if the first unique identifier matches the stored first unique identifier and the second unique identifier matches the stored second unique identifier; and
    disallow the subsequent initializations from proceeding if the first unique identifier does not match the stored first unique identifier or the second unique identifier does not match and the stored second unique identifier.

2. The system of claim 1 wherein:
  the first component includes a flash memory device; and
  the second component includes a random access memory device.

3. The system of claim 1 wherein the processor includes a baseband processor.

4. The system of claim 1 further comprising:
  a sensor located on the printed circuit board that is arranged and configured to sense a characteristic of the printed circuit board, wherein:
  the processor is further arranged and configured to:
    acquire a value of the characteristic of the printed circuit board from the sensor during the first time initialization;
    store the value of the characteristic as a range of values in the one time programming section during the first time initialization;
    upon the subsequent initializations, acquire the value of the characteristic of the printed circuit board from the sensor;
    compare the value to the range of values stored in the one time programming section;
    allow the subsequent initializations to proceed if the value acquired from the sensor is within the stored range of values; and
    disallow the subsequent initializations from proceeding if the value acquired from the sensor is not within the stored range of values.

5. The system of claim 1 further comprising:
  a voltage sensor located on the printed circuit board that is arranged and configured to sense a voltage on the printed circuit board, wherein:
  the processor is further arranged and configured to:
    acquire the voltage on the printed circuit board from the voltage sensor during the first time initialization;
    store the voltage as a range of voltages in the one time programming section during the first time initialization;
    upon the subsequent initializations, acquire the voltage on the printed circuit board from the voltage sensor;
    compare the voltage to the range of voltages stored in the one time programming section;
    allow the subsequent initializations to proceed if the voltage acquired from the voltage sensor is within the stored range of voltages; and
    disallow the subsequent initializations from proceeding if the voltage acquired from the voltage sensor is not within the stored range of voltages.

6. The system of claim 1 further comprising:
  a temperature sensor located on the printed circuit board that is arranged and configured to sense a temperature on the printed circuit board, wherein:
  the processor is further arranged and configured to:
    acquire the temperature on the printed circuit board from the temperature sensor during the first time initialization;
    store the temperature as a range of temperatures in the one time programming section during the first time initialization;
    upon the subsequent initializations, acquire the temperature on the printed circuit board from the temperature sensor;
    compare the temperature to the range of temperatures stored in the one time programming section;

allow the subsequent initializations to proceed if the temperature acquired from the temperature sensor is within the stored range of temperatures; and disallow the subsequent initializations from proceeding if the temperature acquired from the temperature sensor is not within the stored range of temperatures.

7. The system of claim 1 further comprising:

a current sensor located on the printed circuit board that is arranged and configured to sense a current on the printed circuit board, wherein:

the processor is further arranged and configured to:

acquire the current on the printed circuit board from the current sensor during the first time initialization;

store the current as a range of currents in the one time programming section during the first time initialization;

upon the subsequent initializations, acquire the current on the printed circuit board from the current sensor;

compare the current to the range of currents stored in the one time programming section;

allow the subsequent initializations to proceed if the current acquired from the current sensor is within the stored range of currents; and disallow the subsequent initializations from proceeding if the current acquired from the current sensor is not within the stored range of currents.

8. An electronic device, comprising:

a printed circuit board;

a first component located on the printed circuit board, the first component having a first unique identifier;

a second component located on the printed circuit board, the second component having a second unique identifier; and a processor located on the printed circuit board that includes a one time programming section and that is arranged and configured to:

acquire the first unique identifier from the first component and the second unique identifier from the second component upon a first time initialization;

store the first unique identifier and the second unique identifier in the one time programming section during the first time initialization;

upon subsequent initializations, acquire the first unique identifier from the first component and the second unique identifier from the second component;

compare the first unique identifier to the stored first unique identifier and the second unique identifier to the stored second unique identifier;

allow the subsequent initializations to proceed if the first unique identifier matches the stored first unique identifier and the second unique identifier matches the stored second unique identifier; and disallow the subsequent initializations from proceeding if the first unique identifier does not match the stored first unique identifier or the second unique identifier does not match and the stored second unique identifier.

9. The electronic device of claim 8 wherein:

the first component includes a flash memory device; and the second component includes a random access memory device.

10. The electronic device of claim 8 wherein the processor includes a baseband processor.

11. The electronic device of claim 8 further comprising:

a sensor located on the printed circuit board that is arranged and configured to sense a characteristic of the printed circuit board, wherein:

the processor is further arranged and configured to:

acquire a value of the characteristic of the printed circuit board from the sensor during the first time initialization;

store the value of the characteristic as a range of values in the one time programming section during the first time initialization;

upon the subsequent initializations, acquire the value of the characteristic of the printed circuit board from the sensor;

compare the value to the range of values stored in the one time programming section;

allow the subsequent initializations to proceed if the value acquired from the sensor is within the stored range of values; and disallow the subsequent initializations from proceeding if the value acquired from the sensor is not within the stored range of values.

12. The electronic device of claim 8 further comprising:

a voltage sensor located on the printed circuit board that is arranged and configured to sense a voltage on the printed circuit board, wherein:

the processor is further arranged and configured to:

acquire the voltage on the printed circuit board from the voltage sensor during the first time initialization;

store the voltage as a range of voltages in the one time programming section during the first time initialization;

upon the subsequent initializations, acquire the voltage on the printed circuit board from the voltage sensor;

compare the voltage to the range of voltages stored in the one time programming section;

allow the subsequent initializations to proceed if the voltage acquired from the voltage sensor is within the stored range of voltages; and disallow the subsequent initializations from proceeding if the voltage acquired from the voltage sensor is not within the stored range of voltages.

13. The electronic device of claim 8 further comprising:

a temperature sensor located on the printed circuit board that is arranged and configured to sense a temperature on the printed circuit board, wherein:

the processor is further arranged and configured to:

acquire the temperature on the printed circuit board from the temperature sensor during the first time initialization;

store the temperature as a range of temperatures in the one time programming section during the first time initialization;

upon the subsequent initializations, acquire the temperature on the printed circuit board from the temperature sensor;

compare the temperature to the range of temperatures stored in the one time programming section;

allow the subsequent initializations to proceed if the temperature acquired from the temperature sensor is within the stored range of temperatures; and disallow the subsequent initializations from proceeding if the temperature acquired from the temperature sensor is not within the stored range of temperatures.

14. The electronic device of claim 8 further comprising:

a current sensor located on the printed circuit board that is arranged and configured to sense a current on the printed circuit board, wherein:

the processor is further arranged and configured to:

acquire the current on the printed circuit board from the current sensor during the first time initialization;

store the current as a range of currents in the one time programming section during the first time initialization;

upon the subsequent initializations, acquire the current on the printed circuit board from the current sensor;

compare the current to the range of currents stored in the one time programming section;

allow the subsequent initializations to proceed if the current acquired from the current sensor is within the stored range of currents; and disallow the subsequent initializations from proceeding if the current acquired from the current sensor is not within the stored range of currents.

15. A method comprising:

acquiring a first unique identifier from a first component located on a printed circuit board and a second unique identifier from a second component located on the printed circuit board upon a first time initialization;

storing the first unique identifier and the second unique identifier in a one time programming section of a processor located on the printed circuit board during the first time initialization;

upon subsequent initializations, acquiring the first unique identifier from the first component and the second unique identifier from the second component;

comparing the first unique identifier to the stored first unique identifier and the second unique identifier to the stored second unique identifier;

allowing the subsequent initializations to proceed if the first unique identifier matches the stored first unique identifier and the second unique identifier matches the stored second unique identifier; and disallowing the subsequent initializations from proceeding if the first unique identifier does not match the stored first unique identifier or the second unique identifier does not match and the stored second unique identifier.

16. The method as in claim 15 wherein:

the first component includes a flash memory device; and the second component includes a random access memory device.

17. The method as in claim 15 wherein the processor includes a baseband processor.

18. The method as in claim 15 further comprising:

sensing a characteristic of the printed circuit board using a sensor located on the printed circuit board;

acquiring a value of the characteristic of the printed circuit board from the sensor during the first time initialization;

storing the value of the characteristic as a range of values in the one time programming section during the first time initialization;

upon the subsequent initializations, acquiring the value of the characteristic of the printed circuit board from the sensor;

comparing the value to the range of values stored in the one time programming section;

allowing the subsequent initializations to proceed if the value acquired from the sensor is within the stored range of values; and disallowing the subsequent initializations from proceeding if the value acquired from the sensor is not within the stored range of values.

19. The method as in claim 15 further comprising:

sensing a voltage on the printed circuit board using a voltage sensor located on the printed circuit board;

acquiring the voltage on the printed circuit board from the voltage sensor during the first time initialization;

storing the voltage as a range of voltages in the one time programming section during the first time initialization;

upon the subsequent initializations, acquiring the voltage on the printed circuit board from the voltage sensor;

comparing the voltage to the range of voltages stored in the one time programming section;

allowing the subsequent initializations to proceed if the voltage acquired from the voltage sensor is within the stored range of voltages; and disallowing the subsequent initializations from proceeding if the voltage acquired from the voltage sensor is not within the stored range of voltages.

20. The method as in claim 15 further comprising:

sensing a temperature on the printed circuit board using a temperature sensor located on the printed circuit board;

acquiring the temperature on the printed circuit board from the temperature sensor during the first time initialization;

storing the temperature as a range of temperatures in the one time programming section during the first time initialization;

upon the subsequent initializations, acquiring the temperature on the printed circuit board from the temperature sensor;

comparing the temperature to the range of temperatures stored in the one time programming section;

allowing the subsequent initializations to proceed if the temperature acquired from the temperature sensor is within the stored range of temperatures; and disallowing the subsequent initializations from proceeding if the temperature acquired from the temperature sensor is not within the stored range of temperatures.

21. The method as in claim 15 further comprising:

sensing a current on the printed circuit board using a current sensor located on the printed circuit board;

acquiring the current on the printed circuit board from the current sensor during the first time initialization;

storing the current as a range of currents in the one time programming section during the first time initialization;

upon the subsequent initializations, acquiring the current on the printed circuit board from the current sensor;

comparing the current to the range of currents stored in the one time programming section;

allowing the subsequent initializations to proceed if the current acquired from the current sensor is within the stored range of currents; and disallowing the subsequent initializations from proceeding if the current acquired from the current sensor is not within the stored range of currents.

* * * * *

UNITED STATES PATENT AND TRADEMARK OFFICE
CERTIFICATE OF CORRECTION

PATENT NO. : 8,266,415 B2
APPLICATION NO. : 12/037141
DATED : September 11, 2012
INVENTOR(S) : Nanfang Hu et al.

Page 1 of 1

It is certified that error appears in the above-identified patent and that said Letters Patent is hereby corrected as shown below:

On Title page, field (57), under "ABSTRACT", in column 2, line 13, Delete "unique." and insert -- unique identifier. --, therefor.

Signed and Sealed this
Eighth Day of January, 2013

David J. Kappos
*Director of the United States Patent and Trademark Office*